US006753904B1

(12) United States Patent
Nomura

(10) Patent No.: US 6,753,904 B1
(45) Date of Patent: Jun. 22, 2004

(54) SOLID-STATE IMAGING APPARATUS FOR MOTION DETECTION

(75) Inventor: Hitoshi Nomura, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/363,304

(22) Filed: Jul. 28, 1999

Related U.S. Application Data

(63) Continuation-in-part of application No. 09/203,799, filed on Dec. 1, 1998, now Pat. No. 6,624,849.

(30) Foreign Application Priority Data

Aug. 12, 1997 (JP) .............................. 9-336955
Aug. 10, 1998 (JP) ........................... 10-226101

(51) Int. Cl.[7] ........................ H04N 5/228; H04N 5/217; H04N 5/225; H04N 7/18; H04N 3/14
(52) U.S. Cl. .................... 348/208.1; 348/241; 348/169; 348/155; 348/302
(58) Field of Search ................................ 348/169, 170, 348/171, 172, 208.1, 208.14, 208.16, 155, 302, 303, 304, 319, 320, 321; 382/107

(56) References Cited

U.S. PATENT DOCUMENTS

| | | | | |
|---|---|---|---|---|
| 5,552,823 A | * | 9/1996 | Kageyama | 348/155 |
| 5,602,585 A | * | 2/1997 | Dickinson et al. | 348/155 |
| 5,631,704 A | * | 5/1997 | Dickinson et al. | 348/308 |
| 5,880,775 A | * | 3/1999 | Ross | 348/143 |
| 5,937,092 A | * | 8/1999 | Wootton et al. | 382/192 |
| 5,962,844 A | * | 10/1999 | Merrill et al. | 250/214 A |
| 6,002,428 A | * | 12/1999 | Matsumura et al. | 348/169 |
| 6,215,113 B1 | * | 4/2001 | Chen et al. | 250/208.1 |
| 6,624,849 B1 | * | 9/2003 | Nomura | 348/241 |

FOREIGN PATENT DOCUMENTS

| | | | | |
|---|---|---|---|---|
| EP | 0871326 A | * | 10/1998 | H04N/3/15 |
| JP | 08251488 A | * | 9/1996 | H04N/5/335 |

OTHER PUBLICATIONS

Ma et al. "A Single–Chip CMOS APS Camera with Direct Frame Difference Output"; Oct. 1999; IEEE Journal of Solid–Sta Circuits; vol. 34, No. 10.*
Dickinson et al. "A 256=256 CMOS Active Pixel Sensor with Motion Detection"; 1995; IEEE International Solid–State Circuits Conference; Paper TP 13.5.*

* cited by examiner

Primary Examiner—Wendy R. Garber
Assistant Examiner—John M. Villecco
(74) Attorney, Agent, or Firm—Ipsolon LLP

(57) ABSTRACT

A solid-state imaging apparatus for motion detection that detects motion based on differences between pixel frames to make external image comparison processing unnecessary and to reduce erroneous detection of motion is disclosed. The solid-state imaging apparatus includes a plurality of photoreceptive units arranged in a matrix of rows and columns, a plurality of vertical read lines disposed on each column of the plurality of photoreceptive units, a vertical transfer circuit that sequentially selects a specified row of the plurality of photoreceptive units and successively outputs to a vertical read line a previous pixel output, saved from a previous exposure of incident light on the photoreceptors, and a current pixel output newly generated from exposure of incident light on the photoreceptors, a comparison circuit that compares the previous pixel output and the current pixel output transferred by time division via the vertical read lines, a horizontal transfer circuit which serially transfers the comparison circuit's signals, and a logical calculation circuit that performs a logical calculation on the comparison circuit's signals and reduces the isolated regions of logical change to provide an object motion signal.

6 Claims, 9 Drawing Sheets

SOLID-STATE IMAGING APPARATUS FOR MOTION DETECTION

"This is a continuation-in-part of U.S. patent aplication Ser. No. 09/203,799, filed Dec. 1,1998 U.S. Pat No. 6,624, 849."

BACKGROUND OF THE INVENTION

1. Field of the Invention

The present invention pertains to a solid-state imaging apparatus for motion detection which detects differences between frames of images. More specifically, the present invention pertains to an imaging apparatus for motion detection that compares a pixel output of pixels in an image frame to determine whether objects within the image move and to provide for error correction of false motion signals.

2. Description of the Related Art

Prior art processing apparatuses for motion detection sequentially transfer image data from a solid-state imaging apparatus and detect motion based on differences between frames of this image data.

FIG. 11 is representative of a prior art image processing apparatus for motion detection 100. The image processing apparatus for motion detection 100 consists of a solid-state imaging apparatus 101, an A/D conversion circuit 102 that converts the analog image signal from the solid-state imaging apparatus 101 into a digital signal, a first image memory 103 and a second image memory 104 that save digital signals from A/D conversion circuit 102, and an image processing circuit 105 that compares the digital image data saved in the first and second image memories 103, 104 against one another to detect motion.

In this motion detection apparatus 100, a first frame image signal is first converted into a digital signal by the A/D conversion circuit 102, and then saved in first image memory 103.

Next a second frame image signal is also converted into a digital signal by the A/D conversion circuit 102 and saved in second image memory 104.

The image processing circuit 105 then compares pixels of the digital signal saved in the first image memory 103 with pixels of the digital signal saved in the second image memory 104. The processing circuit detects pixels that differ by more than a specified threshold value and generates a signal indicating detection of a moving object (hereafter the "moving object signal").

In this manner, comparison of successive frames permits detection of motion of a subject. Nevertheless, the aforesaid conventional image processing apparatus for motion detection 100 is not ideal. The motion detection circuitry for the solid-state imaging apparatus 101 is complicated making the image processing apparatus for motion detection 100 overly large and costly.

Another defect of the prior art is that the image signal output from solid-state imaging apparatus 101 is an analog signal, which is supplied to A/D conversion circuit 102. Therefore, the analog signal is conducted along a path presenting an opportunity to be easily affected by noise (interference), which causes the image processing circuit to erroneously generate the moving object signal.

Furthermore, in the motion detector apparatus 100, the dynamic range of the analog image signal is limited by the A/D conversion circuit 102. The input dynamic range of A/D conversion circuit 102 is usually narrower than the dynamic range of the solid-state imaging apparatus 101. Therefore, there is a defect in that the wide dynamic range of solid-state imaging apparatus 101 cannot be effectively used in the course of detecting and processing a moving object.

Also, A/D conversion circuit 102 has a sample rate that may become out of phase with the successive frames provided by the imaging apparatus 101. This type of phase shifting in inter-frame sampling timing can create a slight phase shift in the pixel position to be compared at the image processing circuit 105. If this type of phase shift occurs, a stationary body may have inter-frame differences at its edge portions. Therefore, prior art solid-state imaging apparatuses do not provide the desired precision and reliability of moving object detection.

One proposal for avoiding these defects is to provide a memory to store the image signal for the immediately previous frame and the current frame in each pixel of solid-state imaging apparatus 101, and to additionally provide each pixel with a comparison circuit to compare the image signal stored in this memory, and to generate a moving object signal for each pixel.

However, this design makes the structure of the unit pixel complicated, and reduces the numerical aperture and resolution of the solid-state imaging apparatus 101. In addition, this design can output only the moving object signal from each pixel. Thus, this design can not simultaneously provide an image signal and a motion signal.

It is generally known that a solid-state imaging apparatus comprising a semiconductor device experiences charge fluctuations, which create shot noise. The magnitude of shot noise is proportional to the square root of the signal magnitude. Therefore, the brighter the subject and the higher the signal level, the greater the shot noise that is created.

As a result, in bright locations shot noise looms large in inter-frame differences. If shot noise occurs in inter-frame differences and exceeds the threshold value for a moving-object decision, erroneous motion detection may occur.

One proposal for avoiding erroneous detection due to shot noise is to set the comparison threshold value for differences between frames uniformly high. Nevertheless, this sort of countermeasure has the problem that sufficient motion detection cannot be performed for a low-contrast subject.

Another known problem of using a semiconductor imaging apparatus is that incorrect motion detection may occur when the field is extremely bright or extremely dark because motion signals can not be generated accurately. Also, in addition to the case described above, background differences between frames also occur, such as when tree leaves wave in a wind. This sort of motion is small motion in the background, and should be distinguished from motion of the intended subject that is being monitored.

SUMMARY OF THE INVENTION

The imaging apparatus for motion detection of the present invention includes an imaging unit that receives incident light on an array of pixel elements that provide a pixel output corresponding to the incident light thereby generating an output signal. The imaging apparatus compares sequential pixel output signals from a single pixel, and generates a motion signal which indicates in pixel units whether or not there is a change within the field of coverage. A motion signal processing circuit sequentially fetches the image signals and motion signals associated with the same pixel that were generated by the imaging unit, and determines whether to externally output the motion signals based on the image signals.

Because image signals and motion signals are generated simultaneously, and the motion signals an be controlled based on the image signals, various types of signal processing of the motion signal can be performed easily. Consequently, additional functions relating to the motion detection of an object in the field can be easily implemented.

For example, if the brightness level, or the color components of the desired subjects, or if the brightness level or the color components of objects that are to be excluded as subjects for motion detection are known, it is possible to determine whether or not to externally output a motion signal according to the brightness level and color components of the image signal. As a result, it is possible to reliably detect the motion of the desired subjects only.

Thus with an imaging apparatus for motion detection which compares the pixel output that is being continuously output from the same pixel and thereby generates a motion signal, if any noise is superimposed on an image signal corresponding to the pixel output, the effect of the noise will also appear in the motion signal, and stationary objects can be mistakenly detected as moving objects. However, because the motion signal can be disabled, any noise that is superimposed on the image signal can be reliably reduced, and the motion of objects in the field can be accurately detected.

In a preferred embodiment, the motion signal processing circuit externally outputs those motion signals generated by the imaging unit corresponding to pixel elements in which the image signal has a brightness level that is outside a prescribed range, and externally outputs a signal indicating that there is no change in the field associated with pixel elements in which the image signal has a brightness level that is within the prescribed range. The brightness level of an image signal may be outside a prescribed range by exceeding a prescribed upper limit or by falling below a prescribed lower limit.

Specifically, the motion signal can be disabled when shot noise becomes superimposed on an image signal, as well as under conditions in which it is susceptible to the effects of random noise. Consequently, erroneous detection of stationary objects as moving objects caused by noise can be reliably reduced, and the motion of objects in the image field can be accurately detected.

In preferred embodiments, the imaging unit includes a plurality of photoreceptors, arranged in an array, that generate the pixel output according to the incident light. A plurality of vertical read lines are coupled to columns of the photoreceptors and a vertical transfer circuit that sequentially selects a row of the photoreceptors and sequentially outputs to the vertical read lines the previous frame's pixel output and then the current frame's pixel output. A comparison circuit is coupled to each of the vertical read lines and compares the previous frame's pixel output and the current frame's pixel output that are sequentially transferred via the vertical read lines. A horizontal transfer circuit horizontally transfers the comparison circuit's comparison results that are output on each of the vertical read lines. An image signal output circuit selectively fetches and horizontally transfers either the previous frame's pixel output or the current frame's pixel output which are sequentially transferred via the vertical read lines.

The references to horizontal and vertical transfer of signals is a convenient reference to the orientation of the array of photoreceptors as present in the accompanying drawings of the invention. In this context, a vertical transfer refers to a transfer of signals from a particular row of the array to respective output lines and a horizontal transfer refers to a sequential transfer of signals from the array row on the output line to an output terminal. Alternatively, the vertical transfer may apply to a transfer of signals from a column of the array and the horizontal transfer may refer to a transfer of the signals from the array column to the output terminal.

The present invention also provides a solid-state imaging apparatus for motion detection which reduces external image comparison processing circuits and discriminates against shot noise and small background motions when detecting motion of an intended subject. In addition, the present invention provides a solid-state imaging apparatus for motion detection which can simultaneously output a moving object signal and an image signal.

The present invention reduces erroneous detection of motion in the screen's horizontal and vertical directions. In addition, the present invention can reduce erroneous detection of motion in the time axis direction.

The term "frame" in this application refers to a set of pixel signals from the array of pixel elements. Accordingly, the solid-state imaging apparatus for motion detection need not be limited to devices which perform progressive scanning. For example, the present invention may be applied to devices that perform interlaced scanning.

In the present invention, the image signal output operation does not monopolize the vertical read line, so it does not interfere with the operation of the motion detection side. Accordingly, it is possible to output a moving object signal and an image signal simultaneously.

Embodiments of the present invention also provide a level decision circuit that decides the level of an image signal output from an image signal output circuit, and an output switching circuit that switches and outputs the output of the logical calculation circuit and the comparison circuit's comparison results according to the level decision circuit's decision result.

Because shot noise occurs in proportion to the square root of the signal level, it is concentrated in the high luminance areas of the image signal. Therefore, by deciding whether the image signal exceeds a prescribed level, the level decision circuit can determine the regions most likely to include significant shot noise.

Therefore, for example, when the image signal exceeds a prescribed level the output switching circuit should selectively output the logical calculation circuit output, and when the image signal falls below a prescribed level the output switching circuit should output the comparison circuit's comparison result. This sort of switching operation can selectively and reliably reduce erroneous detection of motion caused by shot noise. Additionally, there is no unnecessary removal of isolated regions with little shot noise, so the detection apparatus can reliably detect the motion of small detection subjects.

On the other hand, in cases in which the signal level is extremely small, random noise from circuit systems and the like dominate. (In particular, random noise is amplified and strongly manifested in connection with signal level drops when a peak AGC circuit or the like is interposed in a circuit.)

Performing output switching between the logical calculation circuit output and the comparison circuit's comparison result in response to the level decision circuit's decision result as in the examples given above makes it possible to selectively reduce motion detection errors due to noise, etc., and makes it possible to detect the motion of small detection subjects.

The present invention also provides a solid-state imaging apparatus for motion detection wherein the comparison circuit is a circuit that decides whether or not the current frame's pixel output and the previous frame's pixel output agree within an allowed range, and that outputs a binary signal according to the truth or falsity of the decision result.

DESCRIPTION OF THE PREFERRED EMBODIMENTS

Next, preferred embodiments of the present invention are explained with reference to the accompanying figures.

A First Preferred Embodiment

Figure 1:
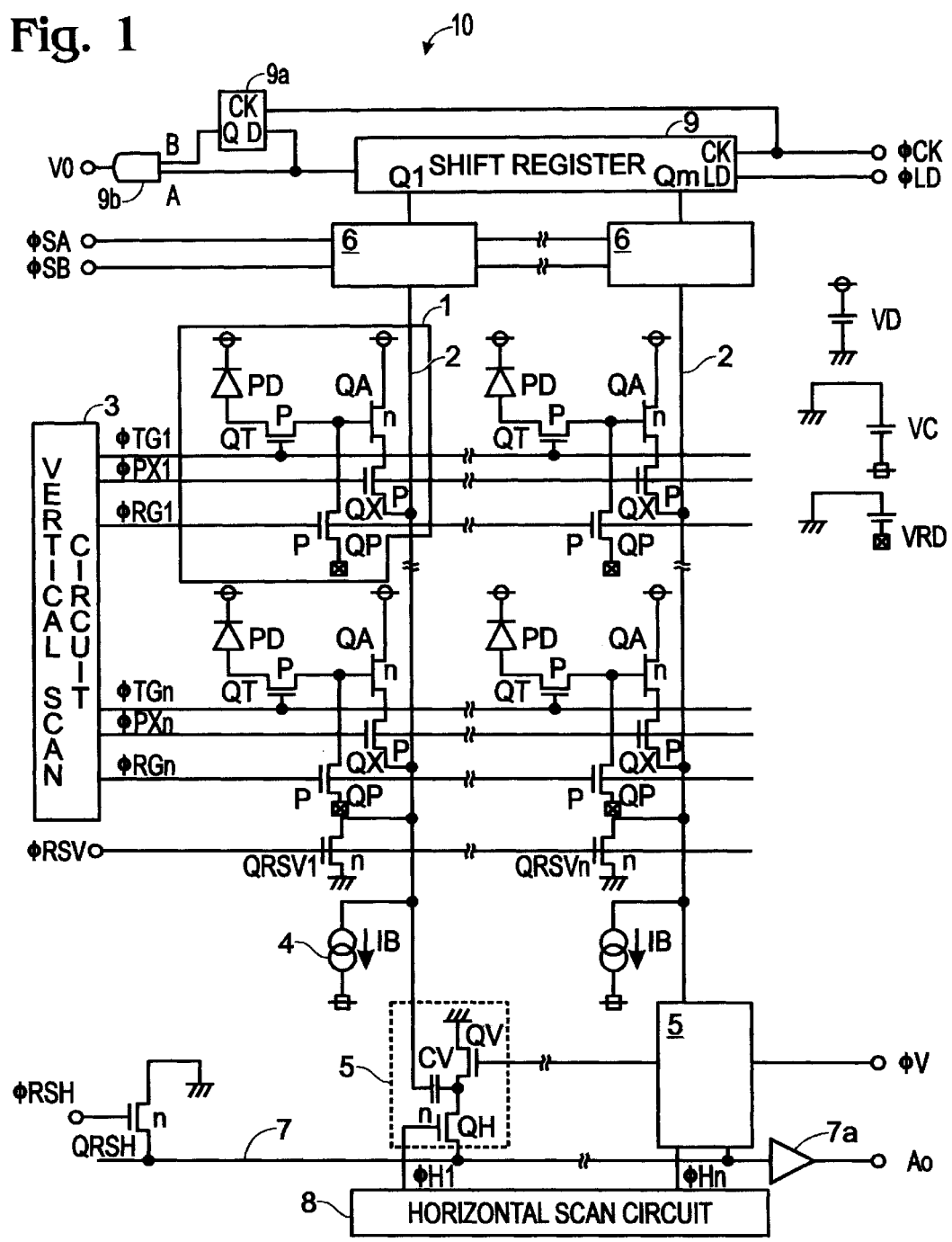
FIG. 1 is a schematic drawing of a circuit of a first preferred embodiment of a solid-state imaging apparatus for motion detection of the present invention.

A first embodiment of the present invention is described with reference to FIGS. 1–4. FIG. 1 is a schematic drawing of a circuit of the first embodiment. Unit pixels 1 in solid-state imaging apparatus for motion detection 10 are arranged in a matrix with n rows and m columns. The output of these unit pixels 1 is commonly connected to each vertical column, forming m vertical read lines 2.

Also, vertical scan circuit (also, "vertical transfer circuit") 3 for control of transfer timing is provided in solid-state imaging apparatus for motion detection 10. This vertical scan circuit 3 respectively supplies three types of control pulses, ΦTG1, ΦPX1, and ΦRG1 to the first row's unit pixel 1. Similarly, three types of control pulses, (ΦTG2 ... ΦTGn, ΦPX2 ... ΦPXn, and ΦRG2 ... ΦRGn, are respectively supplied from vertical scan circuit 3 to the unit pixels 1 in the remaining rows 2 to n.

Current source 4 for supplying bias-current, differential processing circuit 5 (a correlated double-sampling circuit), and comparison, or abnormal value detection, circuit 6 are connected to the aforesaid m vertical read lines 2 respectively.

Control pulse ΦV is supplied in common to the sampling control terminals of these differential processing circuits 5. Furthermore, control pulse ΦV may be provided by vertical scan circuit 3, or other source. Also, the output terminals of differential processing circuits 5 are all connected in common, forming horizontal read line 7. The image signal on this horizontal read line 7 is output from the solid-state imaging apparatus 10 via video amp circuit 7a.

Together, the differential processing circuits 5, horizontal read line 7 and horizontal scan circuit 8 comprise an image signal output circuit.

Reset MOS switch QRSH is also connected to horizontal read line 7. Reset control pulse ΦRSH is supplied to the gate of this MOS switch QRSH. This control pulse ΦRSH is output from horizontal scan circuit 8, or other source.

Control pulse ΦH1 is supplied from the horizontal scan circuit 8 to the scan control terminal for the first column's differential processing circuit 5. Similarly, control pulses ΦH2 ... ΦHm, which are output from horizontal scan circuit 8, are respectively supplied to the scan control terminals of the remaining 2 to m columns of differential processing circuits 5.

Meanwhile, two types of control pulses, ΦSA and ΦSB, are supplied in common to the sampling control terminals of m abnormal value detection circuits 6. Control pulses ΦSA and ΦSB may be output from vertical scan circuit 3, or other source. Also, output terminals Q1 ... Qm of m abnormal value detection circuits 6 are respectively connected to shift register (horizontal transfer circuit) 9's parallel inputs. Control pulse ΦLD for determining parallel data intake timing and transfer clock ΦCK for serial transfer are input to shift register 9. These pulses ΦLD and ΦCK can be supplied from horizontal scan circuit 8, or other circuit. Also, the serial output of shift register 9 is supplied to a data input terminal of D flip flop (a bit memory circuit) 9a and to one input of AND circuit 9b, respectively.

The transfer clock ΦCK supplied to shift register 9 is similarly provided to the clock input of this D flip flop 9a. Also, D flip flop 9a's output Q is supplied to the other input of AND circuit 9b. The D flip flop 9a and AND circuit 9b form a logical calculation circuit. The output of this AND circuit 9b is output to outside solid-state imaging apparatus for motion detection 10 as the moving object signal.

Next, based on FIG. 1, the specific circuit structure and connection relationship shall be explained for a unit pixel 1 located at the first row and first column. The other unit pixels 1 have the same circuit structure as the first row/first column unit pixel 1, the only difference being the label on the control pulses.

Photodiode PD is provided in unit pixel 1. The anode of photodiode PD is connected via charge transfer MOS switch QT to the gate of amplifier element QA, which preferably consists of a junction-type field-effect transistor.

Control pulse ΦTG1, which is output from vertical scan circuit 3, is supplied to the gate of the charge transfer MOS switch QT.

The gate of amplifier element QA is connected via signal charge reset MOS switch QP to a wiring layer held at a constant reset potential VRD. Control pulse ΦRG1, which is output from vertical scan circuit 3, is supplied to the gate of this MOS switch QP.

Meanwhile, the source of amplifier element QA is connected via vertical transfer MOS switch QX to vertical read line 2. Control pulse ΦPX1, which is output from vertical scan circuit 3, is supplied to the gate of this MOS switch QX.

The amplifier element QA, MOS switch QT, and MOS switch QP correspond to a pixel output save unit. The vertical transfer MOS switch QX corresponds to a connection and separation unit. Vertical scan circuit 3's function of reading two frames of pixel output in units of one row by time division corresponds to a vertical transfer control means. Time division refers to signals that are separated in time such as successive signals from a particular pixel element.

With reference to FIG. 1, the circuit structure is explained for differential processing circuit 5 located at the first column's vertical read line 2. The differential processing circuits 5 for the second column and thereafter have the same circuit structure as the first column's differential processing circuit 5, the only difference being some of the labels on the control pulses.

First, one end of capacitor CV is connected to vertical read line 2 to hold the dark signal. The other end of capacitor CV is connected to MOS switch QV, which provides a constant potential such as the ground potential, and to horizontal transfer MOS switch QH. The opposite side of MOS switch QH is connected to horizontal read line 7. The control pulse ΦV is supplied to the gate of MOS switch QV. Also, control pulse ΦH1, which is output from horizontal scan circuit 8, is connected to the gate of MOS switch QH.

Figure 2:
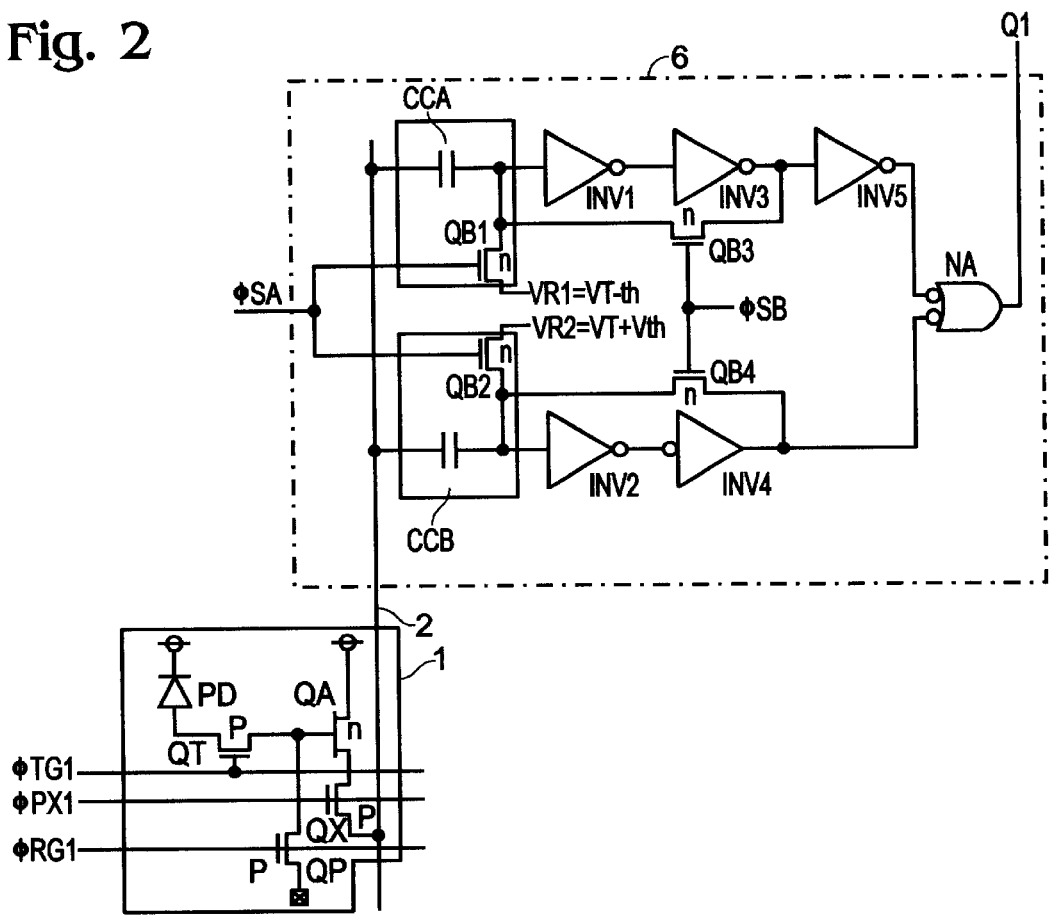
FIG. 2 is a schematic drawing of a circuit of an abnormal value detection circuit of the present invention.

With reference to FIG. 2, the circuit structure is explained for abnormal value detection circuit 6, provided at vertical read line 2's first column. The abnormal value detection circuits 6 for the second column and thereafter have the same circuit structure as the first column's abnormal value detection circuit 6, the only difference being the label on the output signal.

A first end of two capacitors CCA and CCB is respectively connected to vertical read line 2. A second end of capacitor CCA is connected via three inverters INV1, INV3, and INV5 in series to one input terminal of NAND circuit NA. The second end of capacitor CCA is also supplied via MOS switch QB1 with voltage VR1 (=VT−Vth) (defined below) in order to determine the threshold value. Control pulse ΦSA is supplied to the gate of this MOS switch QB1. In addition, the second end of capacitor CCA is connected via MOS switch QB3, which makes an intermittent positive feedback loop to the output of inverter INV3. Control pulse ΦSB is supplied to the gate of this MOS switch QB3.

Meanwhile, a second end of capacitor CCB is connected via two inverters INV2 and INV4 in series to the other input terminal of NAND circuit NA. Also, the second end of capacitor CCB is supplied via MOS switch QB2 with voltage VR2 (=VT+Vth) in order to determine the threshold value.

Voltage VT is a value equivalent to the threshold voltage of inverters INV1 and INV2. Voltage Vth is a predetermined threshold value for determining whether or not the difference between frames is significant.

Control pulse ΦSA is also supplied to the gate of the MOS switch QB2. In addition, the second end of capacitor CCB is connected via MOS switch QB4, which makes an intermittent positive feedback loop, to the output of inverter INV4. Control pulse ΦSB is supplied to the gate of the MOS switch QB4. The output of the aforesaid NAND circuit NA is supplied to shift register 9 parallel input terminal Q1.

Figure 3:
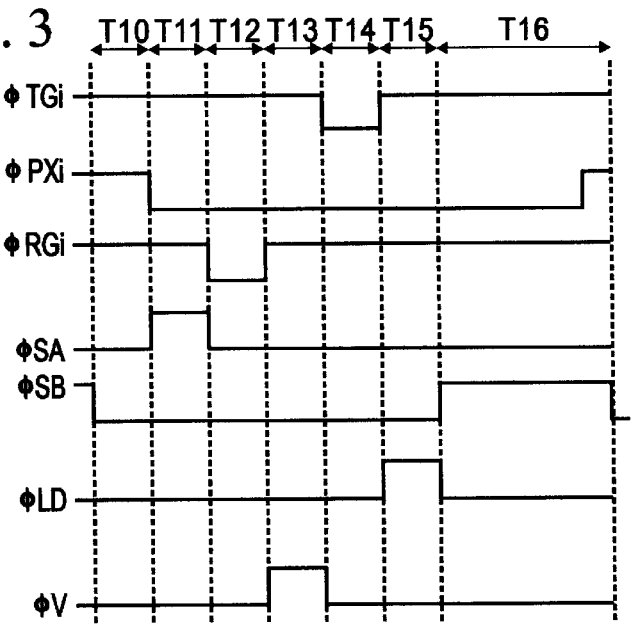
FIG. 3 is a drawing showing the drive timing for vertical transfer of image data in the first preferred embodiment.

FIG. 3 is a drawing showing the drive timing for vertical transfer of row i in the first embodiment. In time interval t10, ΦTGi is held at a high level thereby maintaining p-type switch QT in a non-conducting state. Similarly, ΦPXi is held high keeping p-type switch QX non-conducting. ΦRGi is also at a high level so that p-type switch QP is non-conducting and the gate region of amplifier QA is floating at a level associated with a charge potential generated by photodiodes PD during a previous cycle.

In time interval t10, control pulse ΦSB goes to a low level. As a result, n-type MOS switches QB3 and QB4 in abnormal value detection circuit 6 are interrupted (non-conducting), and the other ends of capacitors CCA and CCB are set in a floating state.

In time interval t11, control pulse ΦPXi is held at a low level, and control pulse ΦSA goes to a high level. Taking control pulse ΦPXi down makes row i p-type MOS switches QX conduct. When this happens, the signal charge which was saved in the gate region of amplifier element QA when the previous frame was read is conducted through switch QX. Therefore, the source follower circuit consisting of amplifier element QA outputs the previous frame (row i pixel output Vold) on vertical read line 2.

Meanwhile, at the abnormal value detection circuit 6 side, control pulse ΦSA going high makes MOS switches QB1 and QB2 conduct. Thus, a charging path is temporarily formed via capacitors CCA and CCB. As a result, the voltage (Vold−VT+Vth) is charged across capacitor CCA and the voltage (Vold−VT−Vth) is charged across capacitor CCB.

When period t11 ends, control pulse ΦSA falls to a low level. Therefore, the second ends of capacitors CCA and CCB are again floating. As a result, the aforesaid voltage is saved as the voltage across capacitors CCA and CCB.

Next, in timing period t12, control pulse ΦRGi goes to a low level. When this happens, MOS switch QP becomes conducting, and the previous frame's signal charge saved in amplifier element QA's gate region is discharged. As a result, the gate region is initialized to reset voltage VRD.

When period t12 ends, control pulse ΦRGi returns to a high level. As a result, MOS switch QP is interrupted, and amplifier element QA's gate region stays floating and saves the reset voltage. Next, in timing period t13, control pulse ΦPXi is held at the original low level. Thus dark signal Vd is output on vertical read line 2 via amplifier element QA's source follower circuit. This dark signal Vd is a signal which includes reset noise from the reset operation (so-called kTC noise) or voltage fluctuations between amplifier element QA's gate and source, which are the main cause of fixed pattern noise.

Meanwhile, control pulse ΦV goes to a high level in period t13. At the differential processing circuit 5 side, control pulse ΦV going high makes MOS switch QV conduct. As a result, a charging path is formed on capacitor CV, and row i dark signal Vd charges capacitor CV in differential processing circuit 5. When period t13 ends, control pulse ΦV falls. Consequently, one end of capacitor CV becomes floating again, and row i's dark signal Vd is saved as the voltage across the capacitor CV group.

Next, control pulse ΦTGi falls to a low level in timing period t14. When this happens, MOS switch QT becomes conducting in row i unit pixel 1, and the current frame's signal charge saved in row i photodiode PD is transferred to amplifier element QA's gate region.

When period t14 ends, control pulse ΦTGi returns to a high level. As a result, MOS switch QT is interrupted, and amplifier element QA's gate region stays floating and saves the increased potential corresponding to the transferred signal charge from photodiodes PD.

Next, in timing period t15, control pulse ΦPXi is still at the low level. Thus, the current frame (row i pixel output Vnow) are newly output from vertical read line 2 via amplifier element QA's source follower circuit.

During this period t15, one end of capacitor CV at the differential processing circuit 5 side experiences a differential voltage with row i dark signal Vd subtracted from the current row i pixel output Vnow. This differential voltage is the "current frame's pixel output" with the dark signal component removed.

And meanwhile, during this period t15, voltage (Vnow−Vold+VT−Vth) appears across capacitor CCA at the abnormal value detection circuit 6 side and the voltage (Vnow−Vold+VT+Vth) appears across capacitor CCB. These voltages are reflected in the boundaries of threshold voltage VT via inverters INV1 and INV2.

As a result of the voltage relationships described above, inverter INV1 outputs a low level when the inter-frame pixel output difference (Vnow−Vold) exceeds Vth. Conversely, inverter INV1 outputs a high level when the interframe pixel output difference (Vnow−Vold) falls below Vth.

Also, inverter INV2 outputs a low level when the inter-frame pixel output difference (Vnow−Vold) exceeds (−Vth). And, inverter INV2 outputs a high level when the inter-frame pixel output difference (Vnow−Vold) falls below (−Vth).

These logical outputs pass through inverters INV3 to INV5, and then are respectively input to NAND circuit NA. As a result, NAND circuit NA outputs at a low level when the value of the inter-frame pixel output difference (Vnow−Vold) is within the allowed range of −Vth to Vth. And NA outputs at a high level when the value of the inter-frame pixel output difference (Vnow-Vold) is outside the allowed range of −Vth to Vth. Through this operation the output of NAND circuit NA is a binary signal indicating whether or not the inter-frame pixel output agrees with the allowed range.

Control pulse ΦLD goes to a high level in period t15. As a result, the binary signals output from m NAND circuits NA are accepted in one batch by shift register 9's parallel input terminals Q1 . . . Qm, and respectively saved as shift register 9's internal values D1 . . . Dm.

Next, in timing period t16, control pulse ΦSB goes high, making MOS switches QB3 and QB4 conduct. As a result, capacitors CCA and CCB are recharged in the positive feedback direction via inverters INV3 and INV4, and the output of NAND circuit NA is stabilized.

Figure 4:
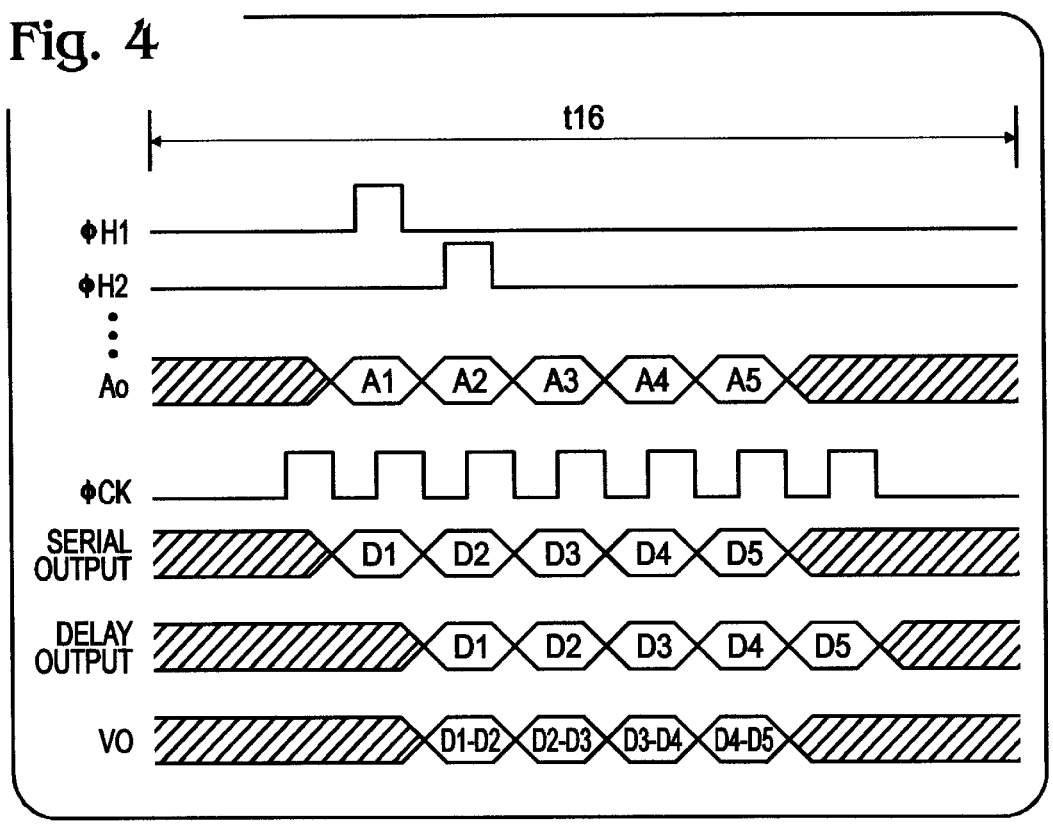
FIG. 4 is a drawing showing the drive timing for horizontal transfer of image data in the first preferred embodiment.

FIG. 4 is a drawing showing the drive timing for horizontal transfer in period t16. First, in timing period t16, horizontal scan circuit 8 sequentially sets control pulses ΦH1 . . . ΦHm to a high level, one after another.

Therefore one end of m columns of capacitors CV is connected to horizontal read line 7 in the sequence of columns 1 to m. As a result, the current frame and row i image signal (A1 . . . A5, etc. in FIG. 4) are sequentially output on horizontal read line 7.

Furthermore, in coordination with the period in which control pulses ΦH1 . . . ΦHm are at a high level, ΦRSH is temporarily set to a high level. Through this sort of operation the residual charge on horizontal read line 7 is discharged each time via MOS switch QRSH. Therefore, a residual charge does not get mixed into the horizontally transferred image signal.

And meanwhile, in timing period t16, transfer pulse ΦCK is sequentially applied to shift register 9. Internal values D1 . . . Dm are serially output from the serial output of shift register 9 in sync with the fall of this transfer pulse ΦCK.

The serial output D1 . . . Dm passes through D flip flop 9a and is delayed by just one pixel (one clock pulse). AND circuit 9b performs a logical AND operation on serial output D1 . . . Dm and delayed serial output D1 . . . Dm, and outputs it externally as the moving object signal V0.

Furthermore, the series of processes performed on row i as described above are repeatedly performed in sequence on other horizontal rows, so the current frame's image signal is sequentially output from horizontal read line 7, and one frame of moving object signal is sequentially output from output terminal V0.

In the first embodiment, through the operation described above, abnormal value detection circuit 6 compares two frames of pixel output which are output on vertical read line 2 by time division, thereby making it possible to detect motion of the detection subject.

Therefore, it becomes completely unnecessary to provide support circuits such as an A/D conversion circuit, image memory or image processing circuits, etc. external to the solid-state imaging apparatus in order to perform motion detection. As a result, the monitoring apparatus needed to detect motion can be made into an apparatus which is small and inexpensive.

Also, in the first embodiment the moving object signal is created without using an A/D conversion circuit. Therefore there are no dynamic range limitations due to the A/D conversion circuit, and motion can be detected using the wide dynamic range of the solid-state imaging apparatus itself.

Also, in the first embodiment the previous frame's pixel output and the current frame's pixel output are compared without pixel position phase shifting inside the solid-state imaging apparatus. Therefore there is no problem of erroneous detection of motion in the image's edge portion, as compared to examination by an external circuit of the differences between frames.

Also, in the first embodiment the "current frame's pixel output" is selectively output on vertical read line 2 by time division, so the image signal can be output. Simultaneous output of the moving object signal and the image signal in this manner makes it extremely suitable for applications in which motion is detected while observing or recording a screen, as in a monitoring apparatus.

In addition, vertical read line 2 is efficiently utilized in the first embodiment to output two frames of pixel output and also the dark signal by time division. Based on this dark signal, differential processing circuit 5 can obtain high-quality pixel output with the dark signal removed.

In particular, the first embodiment uses a logical calculation circuit consisting of D flip flop 9a and AND circuit 9b to examine serial outputs D1 . . . Dm and remove isolated points at which only one pixel is at high level in the screen horizontal direction. Therefore, it is possible to efficiently reduce erroneous detection of motion caused by shot noise or small background motions.

Furthermore, in the first embodiment a single D flip flop 9a was provided and the logical AND calculation for the moving object signal was performed between two horizontally adjacent pixels, but the present invention is not restricted to this. For example, two or more bit memories (flip flop circuits, etc.) can be arranged in series and a logical AND calculation can be performed on the output of each of these bit memories and the serial output of shift register 9. This sort of structure allows performing logical AND calculations over a wide range, so motion detection errors can be reduced even more reliably.

A Second Preferred Embodiment

Figure 5:
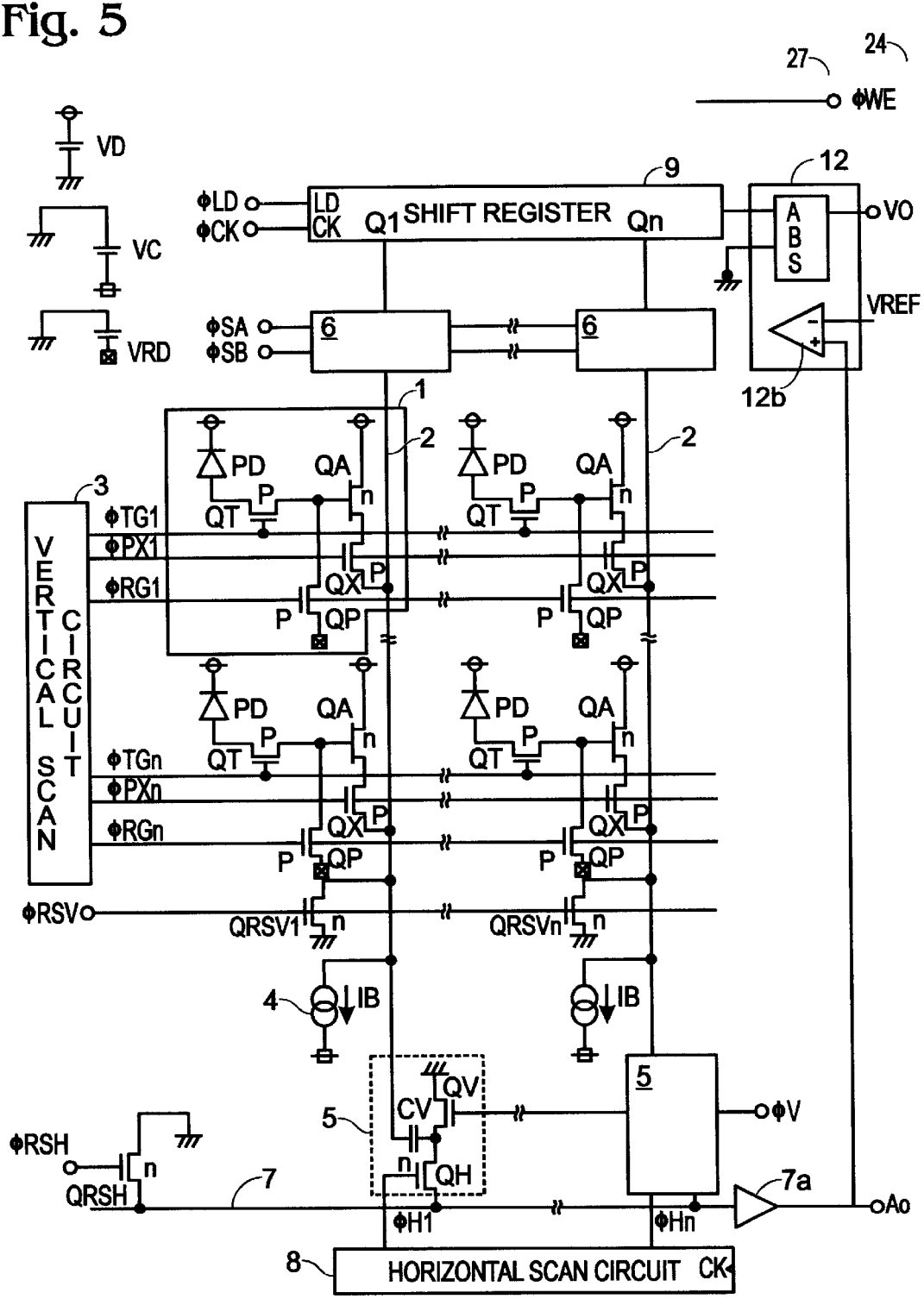
FIG. 5 is a schematic drawing of a circuit of a second preferred embodiment of the present invention.
Figure 6:
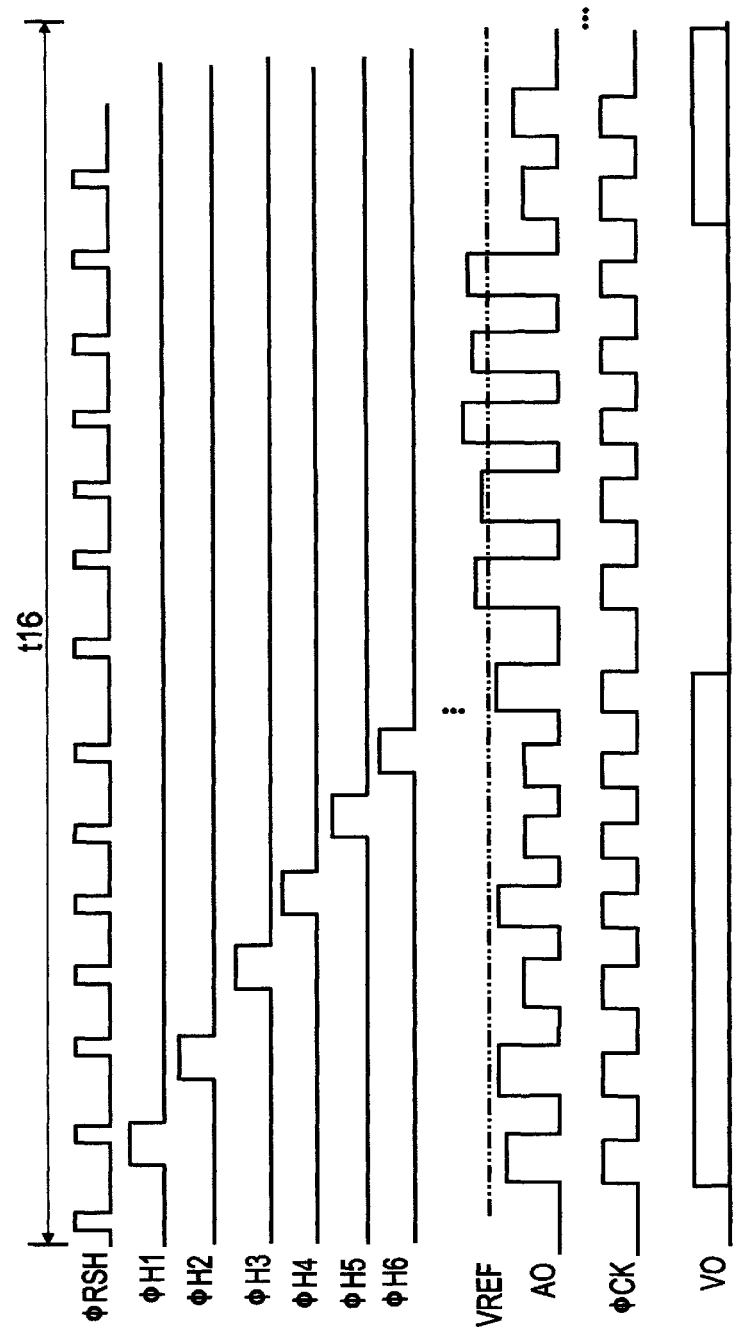
FIG. 6 is a drawing showing the drive timing for horizontal transfer of image data in the second preferred embodiment.

Next, a second preferred embodiment of the present invention is explained with particular reference to FIGS. 5 and 6. FIG. 5 is schematic drawing of the circuitry of this second preferred embodiment showing an imaging apparatus for motion detection 10'.

In this second preferred embodiment, a motion signal processing circuit 12 replaces the D flip flop 9a and circuit 9b of the first preferred embodiment. With this exception, the circuit of FIG. 5 is substantially similar to the circuit of FIG. 1.

The motion signal circuit 12 includes a data selector 12a and a voltage comparator 12b. The motion signal output from shift register 9 is supplied to an input terminal A of the data selector 12a. An input terminal B of data selector 12a is grounded. Data selector 12a further includes a control input terminal S. In addition, the signal output from data selector 12a is output to output terminal VO.

If a signal indicating a low level (as explained below) is supplied to the control input terminal S, data selector 12a outputs the motion signal supplied to input terminal A. Alternatively, if a signal indicating a high level is supplied to control input terminal S, data selector 12a outputs the signal (ground) that is supplied to input terminal B.

Control input terminal S receives signals from the voltage comparator 12b. Voltage comparator 12b receives an image signal from video amp circuit 7a and a reference voltage VREF. The image signal is provided to the non-inverted terminal of the voltage comparator 12b and the VREF signal is provided to the inverted terminal. VREF provides a reference voltage for judging the brightness level.

The drive timing for vertical transfer of image data in this second preferred embodiment is the same as shown in FIG. 3 described above in connection with the first preferred embodiment. Therefore, the drive timing for vertical transfer is not explained here.

FIG. 6 shows the drive timing for horizontal transfer in this second preferred embodiment. First, in the timing period t16 shown in FIG. 6, horizontal scan circuit 8 sequentially sets control pulses ΦH1 to ΦHm to high level one after another. As a result, one end of m columns of capacitors CV is connected to horizontal read line 7 in the sequence of columns 1 to m. Consequently, the image signal of row i of the current frame (equivalent to the signal shown as Ao in FIG. 6) is output to horizontal read line 7.

Furthermore, while the control pulses ΦH1 through ΦHm are set to a high level, the control pulse ΦRSH is temporarily set to a high level. As a result, the residual electric charge on horizontal read line 7 is discharged each time via reset MOS switch QRSH. Thus, residual electric charge is not mixed into the image signal that is horizontally transferred.

In addition, in period t16 transfer pulse ΦCK is sequentially supplied to shift register 9. As a result, the internal values Q1 to Qm are serially output as a motion signal from shift register 9 in sync with the fall of transfer pulse ΦCK.

Accordingly, in this preferred embodiment, by matching the timing of the rising of control pulses ΦH1 through ΦHm with the transfer pulse ΦCK, the image signal output to horizontal read line 7 and the motion signal output from shift register 9 can be synchronized to an accuracy of within 1 pixel. Thus, the motion signal and the image signal that have been synchronized to an accuracy of within 1 pixel are supplied to motion signal processing circuit 12.

The action of motion signal processing circuit 12 is now explained. The voltage comparator signals are supplied to control input terminal S of data selector 12a. When a signal indicating a low level is supplied to control input terminal S, data selector 12a outputs the motion signal supplied to input terminal A, and when a signal indicating a high level is supplied to control input terminal S, the data selector outputs, the signal supplied to input terminal B.

Consequently, when the brightness level of the image-signal is less than reference voltage VREF, motion signal processing circuit 12 outputs the motion signal from shift register 9, and when the brightness level of an image signal is more than reference voltage VREF, the motion signal processing circuit does not output the motion signal, but rather outputs a ground level signal.

In the preferred embodiment, those video signals of a current frame in which the brightness level exceeds VREF are judged to be shot noise, and the motion signals corresponding to these can be disabled. Consequently, erroneous detection of motion that is caused by shot noise can be reliably reduced as a result of this preferred embodiment.

Preferably, motion signals are not output if the brightness level of an image signal exceeds reference voltage VREF, however, the present invention is not limited to this. For example, because there is little susceptibility to the effects of random noise when the field is dark, erroneous detection caused by random noise may also be prevented by not allowing motion signals to be output when the brightness level falls below a prescribed value.

Reference voltage VREF may be set to a level at which random noise is not a problem (e.g., VREF>100 times the random noise level), so that a motion signal will not be output if the brightness level of the image signal falls below reference voltage VREF. Furthermore, specific examples of circuitry for preventing erroneous detection caused by. random noise include reversing the polarity of voltage comparator 12b in motion signal processing circuit 12 in FIG. 5, or reversing the input terminals A and B of data selector 12a.

In addition, when an image signal has a high enough level of brightness that shot noise becomes a problem, as well as when it has a low enough level of brightness that random noise becomes a problem, erroneous detection of motion caused by shot noise and random noise can be prevented by not allowing motion signals to be output. Because the effects of both high brightness components in which shot noise becomes a problem, and low brightness components in which random noise becomes a problem can be simultaneously eliminated in this way, motion detection can be made more accurate.

Accordingly, a specific example of circuitry for preventing erroneous detection caused by shot noise and random noise is to establish a voltage comparator for detecting high brightness at which shot noise becomes a problem, establish a voltage comparator for detecting low brightness at which random noise becomes a problem, and to supply the logical sum of these voltage comparators to control input terminal S of the data selector.

In addition, in this preferred embodiment, data selector 12a is used in motion signal processing circuit 12 as the circuit which selects whether or not to output a motion signal according to the judged results of the brightness level of the image signal. However, the present invention is not limited to this. For example, circuitry of any composition can be used provided it can switch the input according to the judged results of the brightness level of the image signal, and can reset the output.

Furthermore, in this preferred embodiment, motion signals corresponding to image signals in which shot noise has occurred are disabled by determining whether or not to output a motion signal according to the brightness level of the image signal. However, the present invention is not limited to this. For example, whether or not to output a motion signal can be determined according to the color component of the image signal. By determining whether or not to output a motion signal according to the color component of the image signal in this way, if the color components of the objects one desires to be the subjects for motion detection are known, or if the color components of the objects one desires to be excluded as subjects for motion detection are known, it is possible to detect the motion only of those objects one desires to be the subjects of motion detection.

A Third Preferred Embodiment

Figure 7:
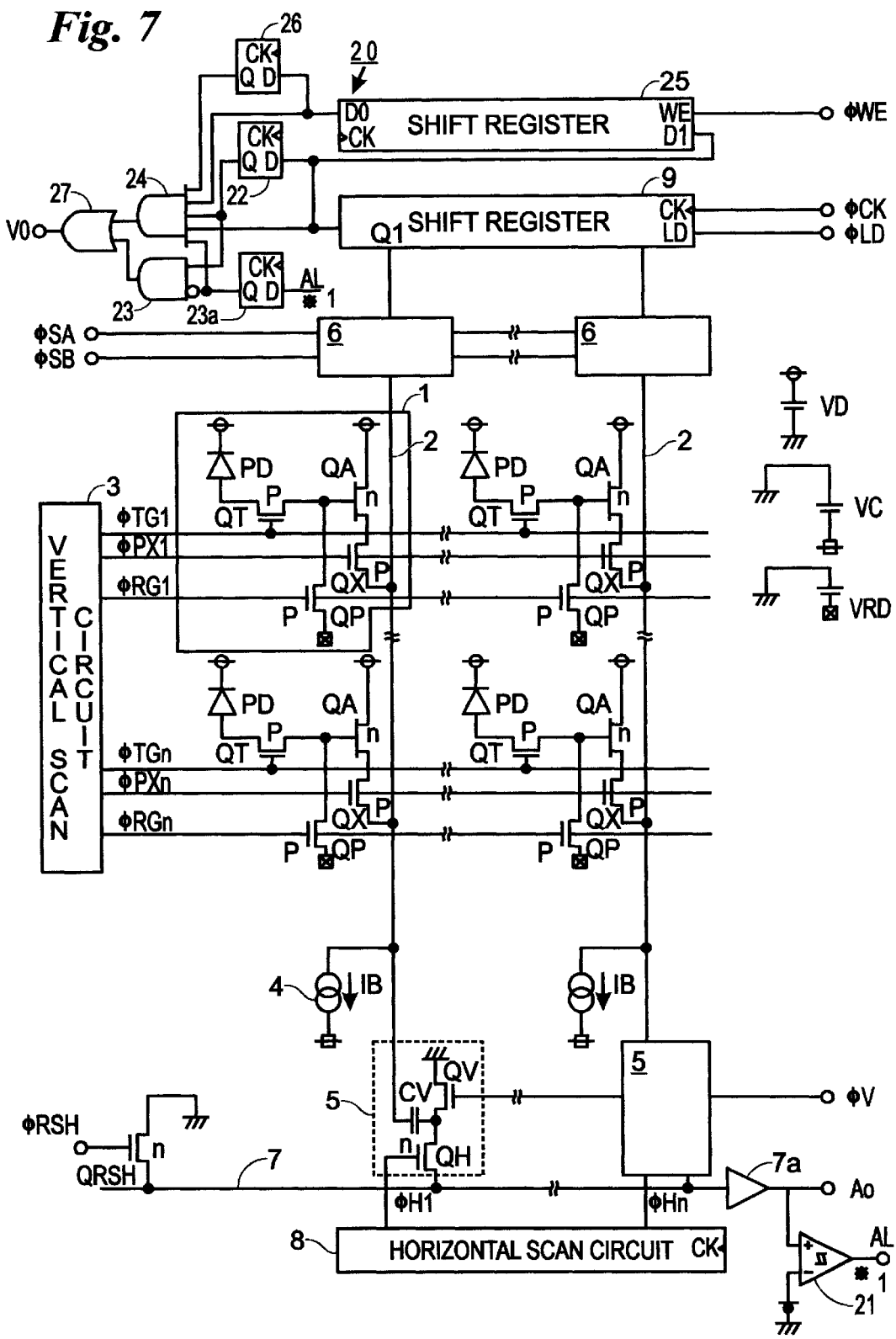
FIG. 7 is a schematic drawing of a circuit of a third preferred embodiment of the present invention.

A third preferred embodiment is now explained with reference to FIGS. 7 and 8. FIG. 7 is a schematic drawing of the circuit of the third embodiment.

The following discussion relates to differences of the third preferred embodiment 20 as to the first preferred embodiment 10. The image signal output from video amp 7a is externally output and also supplied to a positive side input of a comparator 21. Comparator 21 decides the threshold value of the image signal level and outputs a binary level decision signal AL.

This level decision signal AL passes through a D flip flop 23a and is delayed by just one horizontal pixel, and then supplied to an AND circuit 23 inverted side input and to an AND circuit 24 first input, respectively.

Meanwhile, shift register 9 serial output is respectively supplied to D flip flop 22 data input, AND circuit 24 second input, and shift register 25 serial input. D flip flop 22 data output is respectively supplied to AND circuit 23 non-inverted side input and AND circuit 24 third input.

Also, shift register 25 serial output is respectively supplied to AND circuit 24 fourth input and D flip flop 26 data input. D flip flop 26 data output is supplied to AND circuit 24 fifth input.

In addition, the aforesaid AND circuit 23 output and AND circuit 24 output are respectively input to OR circuit 27. OR circuit 27 output is externally output as the moving object signal.

Other schematic requisites are substantially similar to the schematic requisites of the first preferred embodiment of FIG. 1, and are indicated by the same reference codes in FIG. 7, and discussion of them is omitted here.

Next, the operation when doing a horizontal transfer in the third embodiment is explained. The vertical transfer operation in the third embodiment is the same as in the first embodiment of FIG. 3, so discussion of that operation is omitted here.

Figure 8:
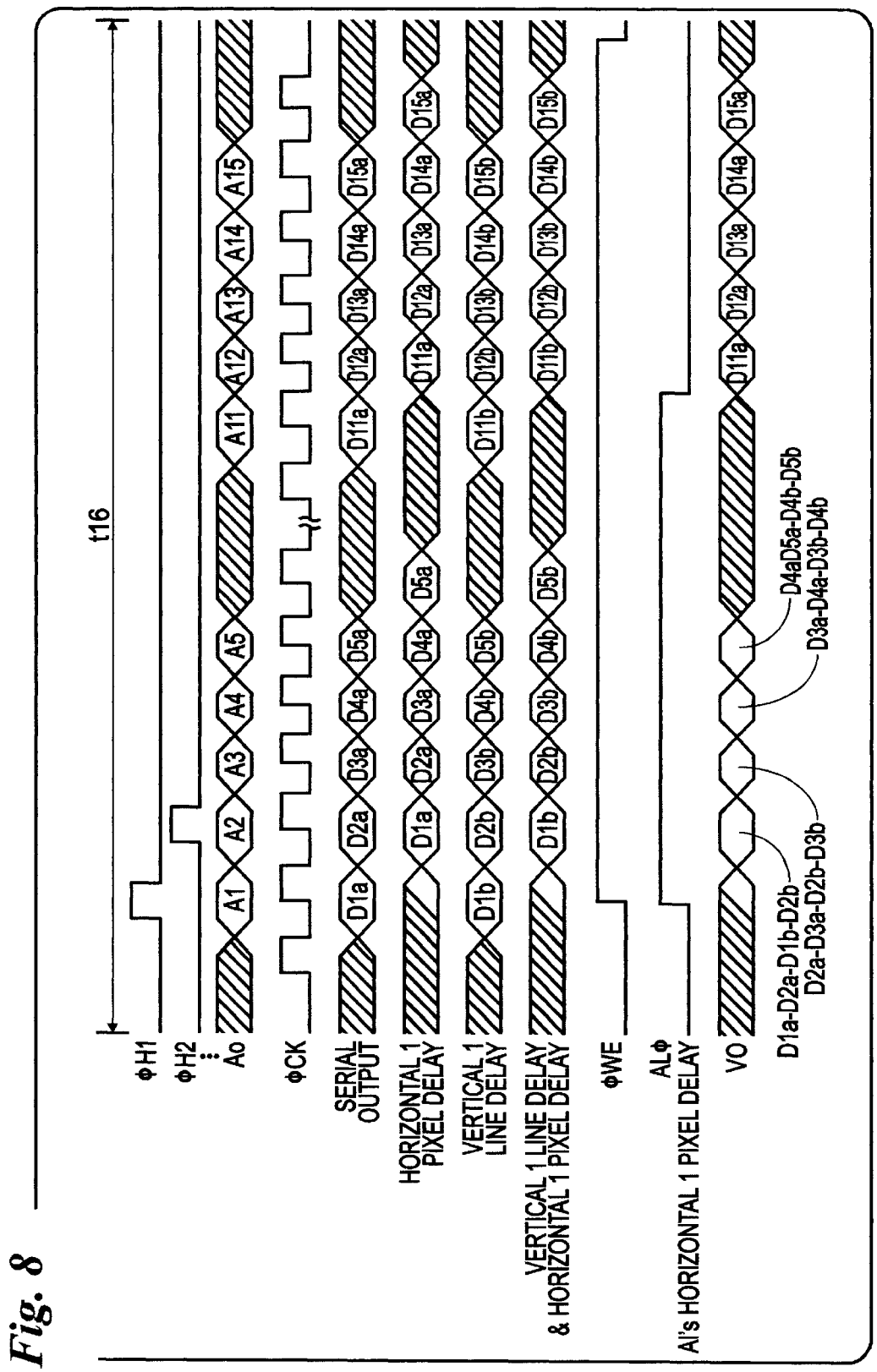
FIG. 8 is a drawing showing the drive timing for horizontal transfer of image data in the third preferred embodiment.

FIG. 8 is a drawing showing the drive timing for horizontal transfer in period t16. First, in timing period t16, horizontal scan circuit 8 sequentially sets control pulses ΦH1 ... ΦHm to high level, one after another. Therefore one end of m columns of capacitors CV is connected to horizontal read line 7 in the sequence of columns 1 to m. As a result, the current frame and row i's image signal (A1 ... A5, A11 ... A15, etc. in FIG. 6) are sequentially output on horizontal read line 7.

Comparator 21 decides the threshold value of the image signal level and outputs level decision signal AL. This level decision signal AL is a binary signal indicating a high level at the image signal's high luminance area.

Meanwhile, in timing period t16, transfer pulse ΦCK is sequentially applied to shift register 9 and shift register 25. Inter-frame comparison results D1a ... Dma, which are the output of abnormal value detection circuit 6, are serially output from the serial output of shift register 9 in sync with the fall of this transfer pulse ΦCK.

Inter-frame comparison results D1a ... Dma pass through shift register 25 and are delayed just by one vertical line. As a result, comparison results D1b ... Dmb, which are delayed just by one vertical line, are sequentially output from shift register 25's serial output.

The comparison results D1a ... Dma pass through D flip flop 22 and are delayed by just one pixel (one clock pulse). Also, comparison results D1b ... Dmb, which are delayed just by one vertical line, pass through D flip flop 26 and are additionally delayed by just one pixel (one clock pulse). As a result, the inter-frame comparison results are summarized as just 2 vertical pixels×2 horizontal pixels and simultaneously input to the four input terminals of AND circuit 24.

Meanwhile, D1a ... Dma, which is one pixel of inter-frame comparison result, is input to the input terminal on AND circuit 23's noninverted side in a state which is delayed by just one horizontal pixel.

Level decision signal AL is input in mutually inverted phases to the remaining input terminals of these AND circuits 23 and 24. Therefore output switching is performed according to the logical value of level decision circuit AL:

(1) First, at high luminance areas of the image signal (if level decision signal AL, delayed by one horizontal pixel, is at a high level) a logical AND operation is performed on the inter-frame comparison result with each of the 2 vertical pixels×2 horizontal pixels, and the result is output from OR circuit 27. As a result, isolated regions of the sort in which even one pixel is at a low level in either the horizontal or vertical or diagonal direction are removed from the inter-frame comparison results; and (2) At non-high luminance areas of the image signal (if level decision signal AL, delayed by one horizontal pixel, is at a low level) the inter-frame comparison result passes through D flip flop 22 and AND circuit 23 and is output from OR circuit 27 in a state which is delayed by just one horizontal pixel.

This sort of delay operation is a supplementary operation to match the pixel position and phase in the output of the AND circuit 24 side. This delay operation makes seams in the moving object signal due to output switching less conspicuous.

The operation of the third embodiment excludes from the inter-frame comparison results isolated regions which occur when only one pixel is at a high level in either the horizontal or vertical or diagonal direction. As a result, it is possible to efficiently reduce isolated regions caused by shot noise.

Also, in the third embodiment the aforesaid isolated region removal is performed only in the high luminance areas of the image signal. This sort of image signal high luminance areas are sites where the creation of shot noise is particularly concentrated. Therefore removing isolated regions restricted to this sort of high luminance area makes it possible to efficiently reduce the isolated regions created by shot noise.

Meanwhile, at non-high luminance areas of the image signal, inter-frame comparison results pass through AND circuit 23 and are output in a state which is delayed by just one horizontal pixel. Therefore there is no risk of removing isolated regions which are essentially unrelated to shot noise. As a result, it becomes possible to detect the motion of small detection subjects with greater reliability.

Furthermore, in the third embodiment a single shift register 25 (a type of line memory circuit) is provided and the logical AND calculation for the moving object signal was performed between two vertically adjacent pixels. However, the present invention is not so restricted. For example, two or more line memory circuits (shift registers, etc.) can be vertically arranged and a logical AND calculation can be performed on the output of each of these line memory circuits and the serial output of shift register 9. This sort of structure allows performing logical AND calculations over a wider range, and motion detection errors can be reduced even more reliably.

Also, in the third embodiment the logical AND calculation for the moving object signal was performed on just the high luminance side of the image signal, but the present invention is not restricted to this. For example, the logical AND calculation for the moving object signal can be performed on the low luminance side of the image signal. This sort of structure makes it possible to selectively reduce motion detection errors caused by random noise.

A Fourth Preferred Embodiment

Figure 9:
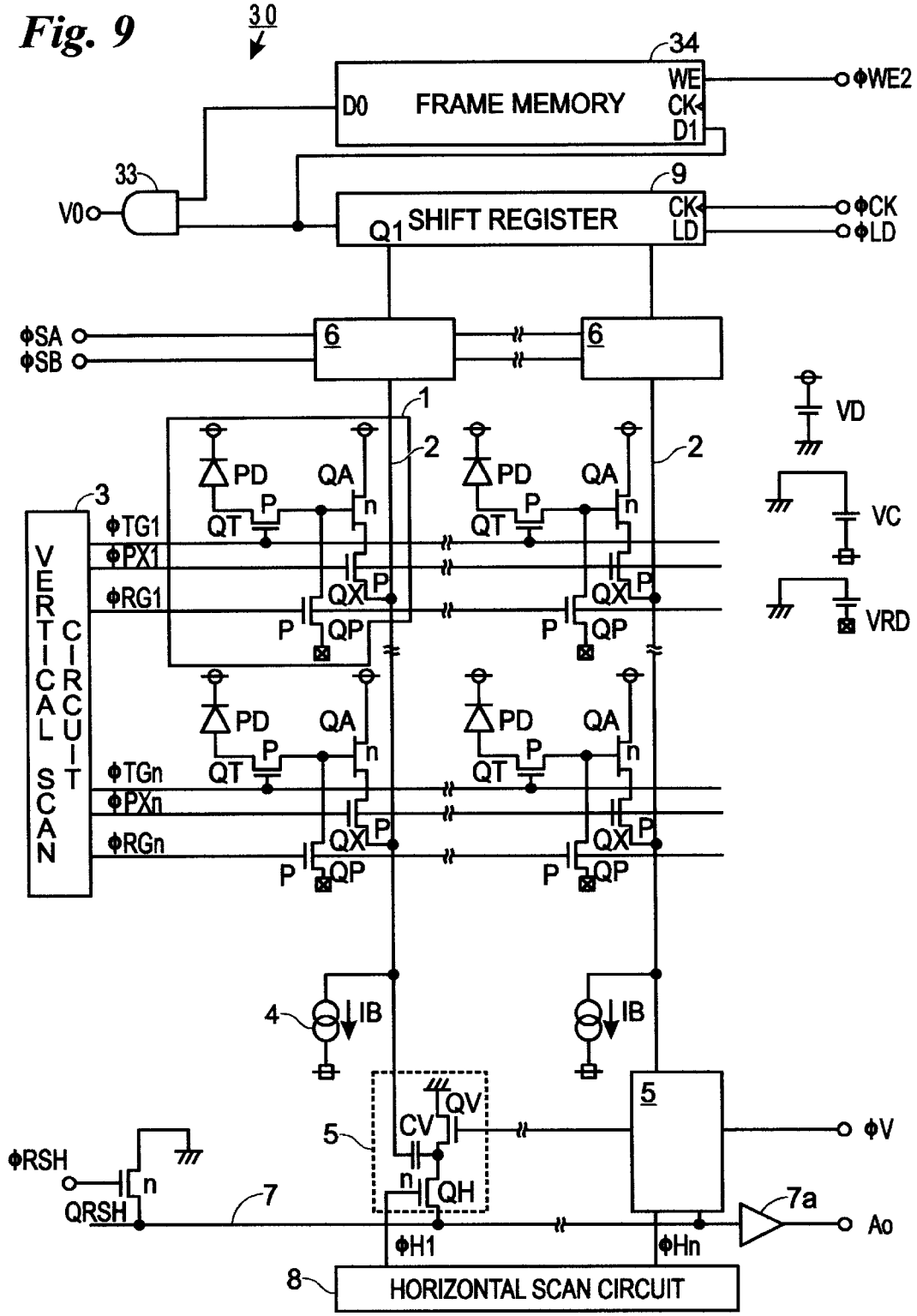
FIG. 9 is a schematic drawing of a circuit of a fourth preferred embodiment of the present invention.

A fourth preferred embodiment is described below with reference to FIGS. 9 and 10. FIG. 9 is a schematic drawing of the circuit of the fourth embodiment. The following discussion relates to differences of the fourth preferred embodiment 30 as to the first preferred embodiment 10.

First, shift register 9 serial output is respectively supplied to one input of an AND circuit 33 and a frame memory 34 data input. The data output of frame memory 34 is supplied to the other input of AND circuit 33. AND circuit 33 output is externally supplied as the moving object signal.

Other schematic requisites are substantially similar to the schematic requisites of the first embodiment of FIG. 1, so they are indicated by applying the same reference codes in FIG. 9, and discussion of them is omitted here.

Next, the operation when doing a horizontal transfer in the fourth embodiment is explained. The vertical transfer operation in the fourth embodiment is the same as in the first embodiment of FIG. 3, so discussion of it shall be omitted here.

Figure 10:
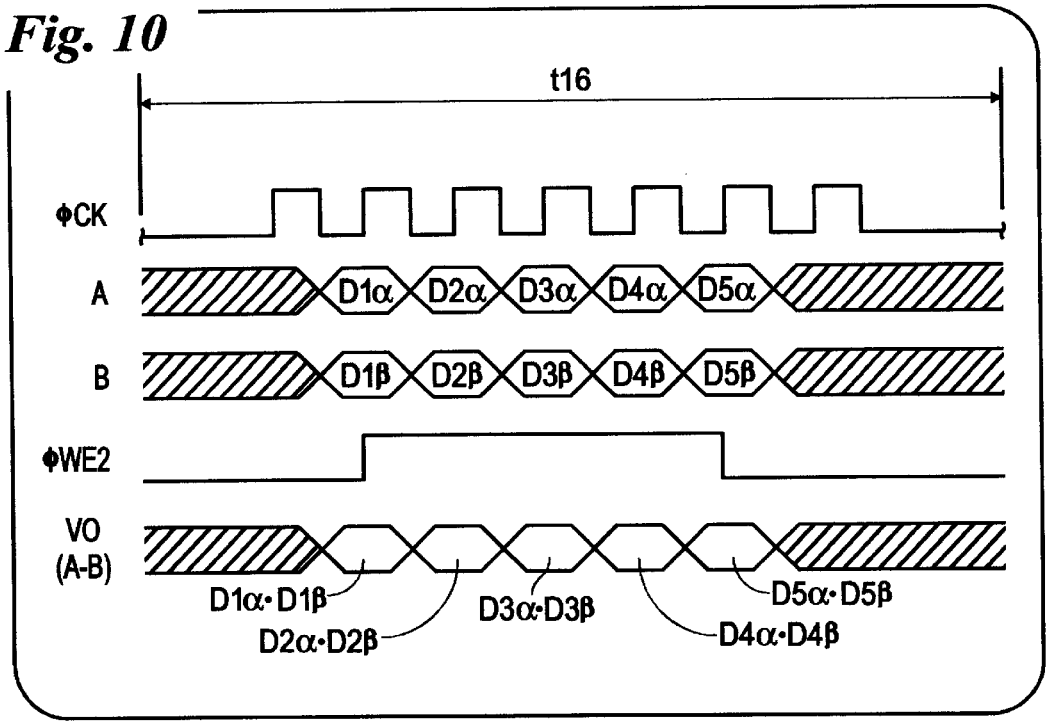
FIG. 10 is a timing chart for horizontal transfer of image data for the circuit of the fourth embodiment.
Figure 11:
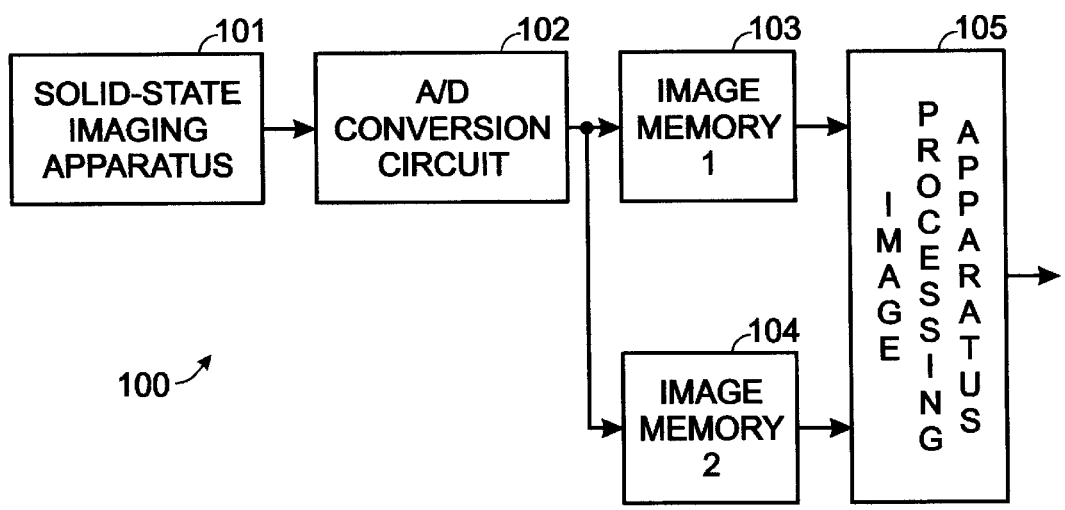
FIG. 11 is a block diagram of a prior art image processing apparatus for motion detection 100.

FIG. 10 is a drawing showing the drive timing for horizontal transfer in period t16. First, in this timing period t16, transfer pulse ΦCK is sequentially applied to shift register 9. Inter-frame comparison results D1$a$ . . . D$ma$ (shown as D1$a$ . . . D5$a$, etc. in FIG. 10), that are the output of abnormal value detection circuit 6, are sequentially output from the serial output of shift register 9 in sync with the fall of this transfer pulse ΦCK and applied to AND circuit 33.

These inter-frame comparison results pass through frame memory 34 and are delayed by just one frame. As a result, the comparison results, delayed by just one frame, are sequentially output from frame memory 34's data output (shown as D1β . . . D5β, etc. in FIG. 8) and applied to AND circuit 33. AND circuit 33 performs a logical AND operation on these comparison results and externally outputs the moving object signal V0.

Through the operation described above, frame memory 34 and the logical calculation circuit consisting of AND circuit 33 exclude the sort of isolated regions which occur when only one pixel is at a high level in the time axis direction from the inter-frame comparison results. Therefore it is possible to reduce motion detection errors caused by shot noise or small background motions.

Furthermore, a junction-type field effect transistor was used as amplifier element QA in the embodiments described above, but the circuit is not so restricted. In general, any element which has an amplifying function can be used as amplifier element QA. For example, a MOS transistor or a bipolar transistor or the like can be used as amplifier element QA. It is also possible to use functional elements which use a combination of these elements. It is also possible to save the signal charge in the parasitic capacitance which occurs at the gate or base of these amplifier elements, and supplementary capacitors, etc. for saving the signal charge at the gate or base of these amplifier elements can be provided.

In addition, vertical transfer MOS switch QX was provided as the connection and separation unit in the embodiments described above, but it is not restricted to this. For example, amplifier element and vertical read line connection and separation control can also be performed by providing a capacitor to accumulate the signal charge at the gate or base of these amplifier elements, and raising or lowering the voltage at the other end of this capacitor.

Also, the aforesaid embodiments described cases in which the signal charge created by photodiode PD was transferred directly to the amplifier element's control region, but the present invention is not restricted to this. For example, the signal charge can be temporarily transferred to a diffusion region and saved there, and then the gate of a MOS transistor can detect the potential of this diffusion region via a signal line.

Furthermore, in the embodiments described above a logical AND calculation for the moving object signal was performed in a spatial direction or a time axis direction, but it is not restricted to this. In general, calculations should be performed to reduce the unrelated noise component in the moving object signal. For example, numerical calculations or the like can be performed instead of a logical AND calculation.

In addition, the first embodiment described above explained a case in which unit pixels 1 were arranged in a two-dimensional matrix ("array"), but of course the present invention can be suitably used in the same way in a linear imaging element arranged in a one-dimensional matrix.

Also, the embodiments described above explain circuit structure based on positive logic, but it is not restricted to this structure. It is possible to use a circuit structure in which part or all of the aforesaid circuit structure is based on negative logic.

As described above, the present invention outputs the previous frame pixel output and the current frame's pixel output on the vertical read line by time division. By comparing these pixel outputs it is possible to achieve motion detection inside a solid-state imaging apparatus. Therefore it is not necessary to specially provide circuits such as an A/D conversion circuit, image memory or image processing circuits, etc. external to the solid-state imaging apparatus.

Also, the present invention does not need to conduct the image signal, which is an analog signal, to an external A/D conversion circuit or the like, so the risk of being affected by peripheral noise is minor.

In addition, the present invention does not need the conventional required AND conversion circuit external to the solid-state imaging apparatus for motion detection. As a result, there are no dynamic range limitations due to the A/D conversion circuit, and motion can be detected using the wide dynamic range of the solid-state imaging apparatus itself.

Also, in the present invention the previous frame's pixel output and the current frame's pixel output are directly compared for each vertical read line. Therefore absolutely no phase shifting occurs in the pixel position to be compared, in contrast to the prior art in which the inter-frame difference is found via A/D conversion. Therefore the risk of inter-frame differences occurring at the edge portion of a stationary body is extremely small, and motion detection can be carried out with even greater high accuracy.

Also, the present invention carries out a logical calculation on the comparison circuit's comparison result and reduces the isolated regions of logical change. Therefore, isolated regions caused by shot noise and tiny background motions are reduced inside the solid-state imaging apparatus, and superfluous motion detection caused by these can be suitably suppressed.

The present invention also selectively outputs one of the pixel outputs transferred by time division on a vertical read line, so the current frame's or the previous frame's image signal can be output. This sort of image signal output operation does not monopolize a vertical read line, so it does not interfere with operation of the motion detection side. Therefore the solid-state imaging apparatus of the present invention makes it possible to simultaneously output the moving object signal and the image signal.

This simultaneous output of image signal and moving object signal greatly increases the variation in image displays using both of these signals, and greatly widens the applications of the solid-state imaging apparatus for motion detection.

The present invention also provides means to perform output switching of the logical calculation circuit's output and the comparison circuit's comparison result according to the image signal's signal level. This switching operation makes it possible to appropriately reduce motion detection errors in accordance with the image signal's signal level. And, at the same time it does not unnecessarily remove isolated regions in accordance with the image signal's signal level, so it is possible to make great efforts to detect the motion of small detection subjects.

For example, when selecting and outputting the output of the logical calculation circuit side in the high luminance area of the image signal, it is possible to selectively reduce motion detection errors due to shot noise. And by selecting and outputting the output of the comparison circuit side in the low luminance area of the image signal, it is possible to make great efforts to detect the motion of small detection subjects which is essentially unrelated to shot noise.

And, for example, if the output of the logical calculation circuit is selected and output in the low luminance area of the image signal, it is possible to selectively reduce motion detection errors caused by random noise in the circuit system, etc. And by selecting and outputting the output of the comparison circuit side in the high luminance area and the medium luminance area of the image signal, it is possible to make great efforts to detect the motion of small detection subjects which is essentially unrelated to random noise.

In addition, for example, if the output of the logical calculation circuit is elected and output in the low luminance area and the high luminance area of the image signal, it is possible to selectively reduce motion detection errors caused by random noise and shot noise. And by outputting the output of the comparison circuit side in the medium luminance area, it is possible to make great efforts to detect the motion of small detection subjects which is essentially unrelated to random noise or shot noise.

Furthermore, each of the above sort of operations is an operation which first becomes possible with a structure which simultaneously outputs a moving object signal and an image signal.

The present invention may also perform a logical AND operation on comparison results along a screen's horizontal direction. Therefore, it excludes isolated points of the sort created by a logical change of only one pixel in the horizontal direction, and can reduce isolated points of logical change created by shot noise or small background motions, etc.

The present invention may also perform a logical AND operation on comparison results along a screen's vertical direction. Therefore, it excludes isolated points of the sort created by a logical change of only one pixel in the vertical direction, and can reduce isolated points of logical change created by shot noise or small background motions, etc.

The present invention may also perform a logical AND operation on comparison results along the time axis direction. Therefore it excludes isolated points of the sort created by a logical change of only one pixel in the time axis direction, and can reduce isolated points of logical change created by shot noise or small background motions, etc.

The present invention may also provide a pixel output save unit for each photoreceptive unit, so the operation of accumulating the current frame's pixel output in the photoreceptive unit and the operation of saving or outputting the previous frame's pixel output can be executed simultaneously and in parallel.

Therefore two frames of pixel output are output on a vertical read line by time division, so the current frame's photoreceptive accumulation period is not restricted. As a result, the pixel output level is high and it is possible to drastically reduce erroneous detection of motion due to noise.

The present invention may also save the pixel output from a photoreceptive unit directly in an amplifier element's control region, so it is not necessary to provide a capacitive component, etc. in order to save the pixel output along the way. This also may eliminate capacitance distribution signal loss in the capacitive component along the way, and make it possible to increase the S/N ratio.

Also, the control region is initialized to a constant reset potential by a reset circuit, so it is possible to prevent mixing pixel outputs between frames. As a result, the pixel output S/N ratio increases, and it is possible to drastically reduce erroneous detection of motion due to noise, etc.

The present invention provides a comparison circuit that outputs a binary signal. Therefore the logical calculation circuit should consist of a general purpose logic circuit. Also, a shift-register circuit may be used to transfer the binary signal. Using this sort of shift register circuit makes it possible to easily achieve high speed and low noise in the operation of horizontally transferring the moving object signal.

In particular, making the moving object signal binary increases the noise margin during signal transfer, so it is-possible to drastically reduce erroneous detection of motion due to noise.

This specification sets forth the best, mode for carrying out the invention as known at the time of filing the patent application and provides sufficient information to enable a person skilled in the art to make and use the invention. The specification further describes materials, shapes, configurations and arrangements of parts for making and using the invention. However, it is intended that the scope of the invention shall be limited only by the language of the claims and the law of the land as pertains to valid U.S. patents.

What is claimed is:

1. An imaging apparatus for detecting motion of objects in an image field, comprising:
   an imaging unit having a plurality of pixels, wherein the imaging unit provides an image signal corresponding to a pixel output generated by incident light from the image field that is incident on the imaging unit, and wherein the imaging unit compares plural pixel outputs from a first pixel of the plurality of pixels and provides a motion signal indicative of a change in the incident light; and
   a motion signal processing circuit that receives plural image signals and motion signals associated with the first pixel and controls output of the motion signals to an output terminal in accordance with a value of the image signals, wherein the motion signal processing circuit controls output of the motion signals so as to provide motion signals to the output terminal when the value of corresponding image signals is indicative of a brightness level that is within a predetermined range.

2. The imaging apparatus of claim 1, wherein the value of an image signal that is indicative of the brightness level that is within the predetermined range corresponds to a change in the image field.

3. The imaging apparatus of claim 1, wherein the imaging unit further comprises:
   a plurality of photoreceptors, wherein the pixel output is generated by the incident light on the photoreceptors; and
   a plurality of read lines coupled to a first group set of the photoreceptors;
   a first transfer circuit that selects a second group set of the photoreceptors and outputs to the read lines a first pixel output and a second pixel output;

a plurality of comparison circuits in communication with a respective plurality of read lines that receives and compares the first pixel output and the second pixel output;

a second transfer circuit that transfers outputs of the comparison circuits; and an image signal output circuit that transfers either the first pixel output or the second pixel output sequentially transferred via the aforesaid read lines.

4. The imaging apparatus of claim 3, wherein the motion signal processing circuit includes a data selector and a voltage comparator.

5. An imaging apparatus for detecting motion of objects in an image field, comprising:

an imaging unit having a plurality of pixels, wherein the imaging unit provides an image signal corresponding to a pixel output generated by incident light from the image field that is incident on the imaging unit, and wherein the imaging unit compares plural pixel outputs from a first pixel of the plurality of pixels and provides a motion signal indicative of a change in the incident light; and a motion signal processing circuit that receives plural image signals and motion signals associated with the first pixel and controls output of the motion signals to an output terminal in accordance with a value of the image signals, wherein the motion signal processing circuit control output of the motion signals so as to block output of the motion signals when the value of corresponding image signals is indicative of a brightnes level that is outside the predetermined range.

6. The imaging apparatus of claim 5, wherein the value of an image signal that is indicative of the brightness level that is outside the predetermined range corresponds to no change in the image field.

* * * * *